April 14, 1964    J. A. HENSON    3,128,729
ALL-PURPOSE FARM MACHINE
Filed May 24, 1960    3 Sheets-Sheet 1
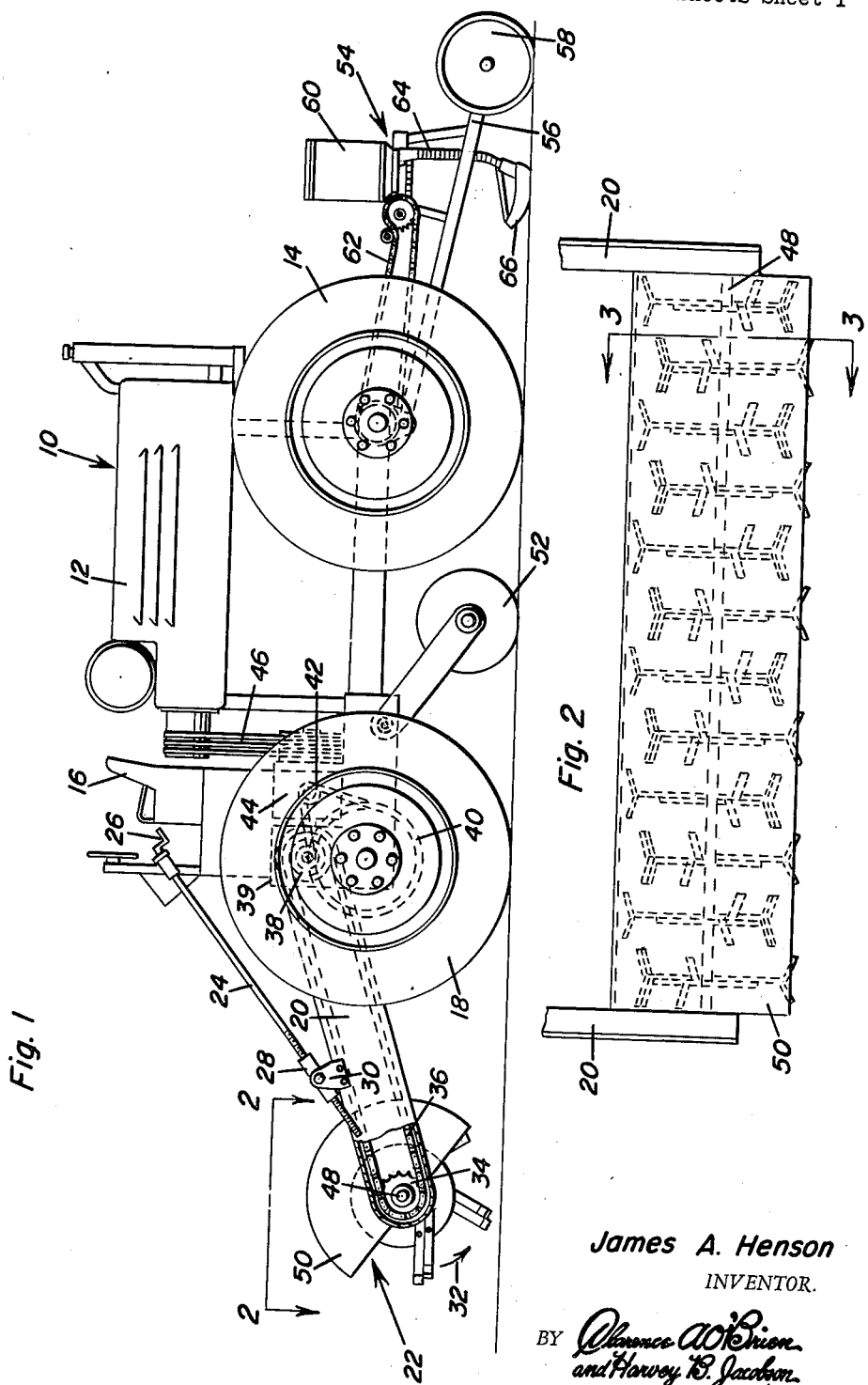
James A. Henson
INVENTOR.
BY Clarence A. O'Brien
and Harvey B. Jacobson
Attorneys April 14, 1964  J. A. HENSON  3,128,729
ALL-PURPOSE FARM MACHINE
Filed May 24, 1960  3 Sheets-Sheet 2

James A. Henson
INVENTOR.

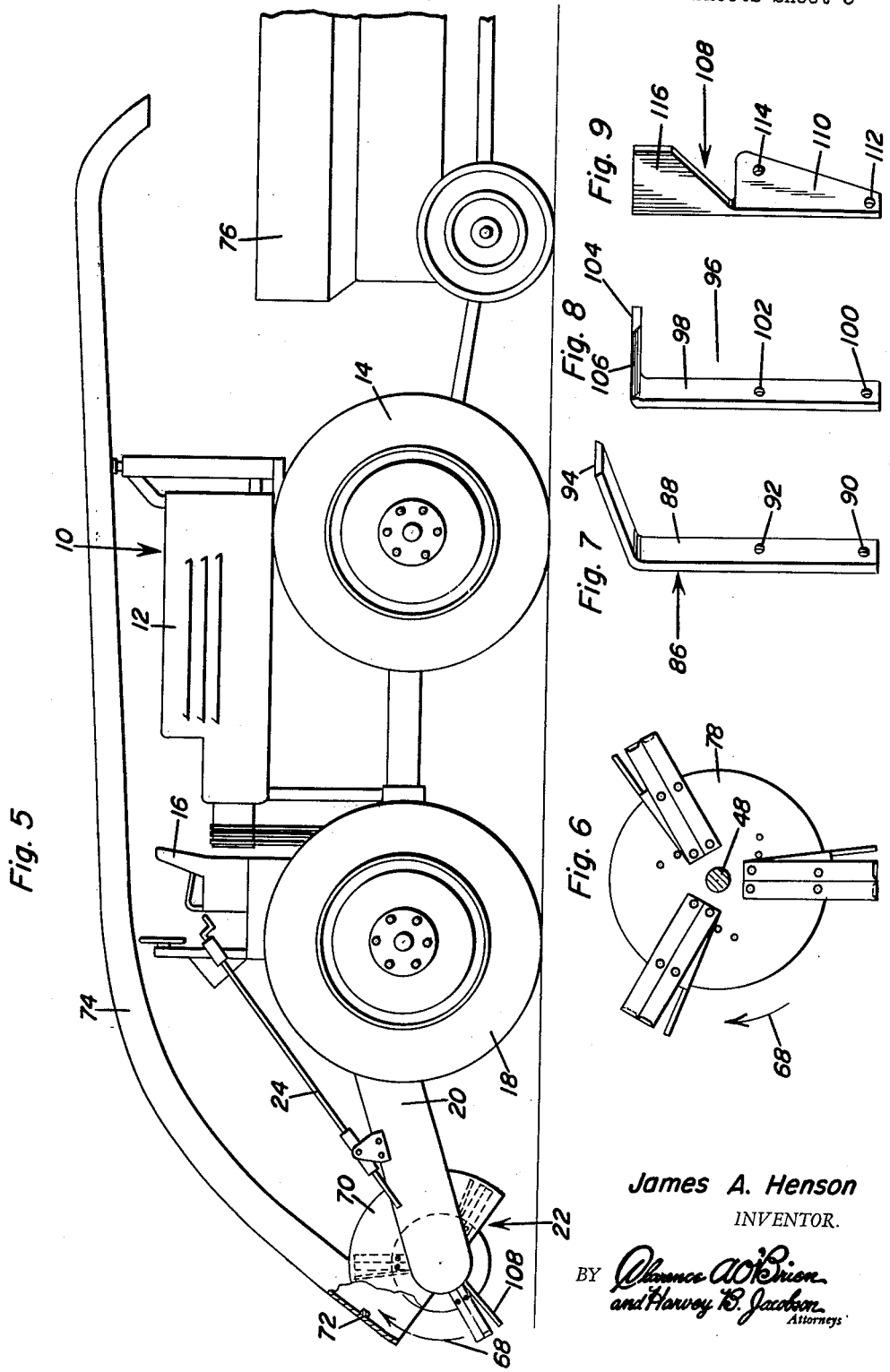

United States Patent Office 3,128,729
Patented Apr. 14, 1964

3,128,729
ALL-PURPOSE FARM MACHINE
James A. Henson, Box 625, Chetopa, Kans.
Filed May 24, 1960, Ser. No. 31,321
5 Claims. (Cl. 111—1)

This invention relates to an agricultural machine designed to perform all the tasks presently accomplished separately by various different farm implements and machinery.

It is therefore a primary object of this invention to provide a single machine with attachable equipment incorporating a novel rotary cutter assembly whereby the machine may be employed to plow, disk, harrow, plant, subsoil, cut brush, and make silage.

Another object of this invention in accordance with the foregoing object, is to provide an all purpose farm machine incorporating a novel cutter assembly having cutter blades or attachments mountable for different functions for which the machine may be used.

A further object of this invention in accordance with the foregoing objects, is to provide a farm machine capable of being equipped to sequentially prepare a soil bed, pack the soil, and plant crop seeds in the prepared soil all in one operation, said machine being readily convertible to a forage harvester including conversion of the soil preparer into a silage cutter and fan blower and the replacement of the seed planter by a silage wagon for collecting the silage cut and blown through a conduit by the cutter and fan blades attached thereto.

An additional object of this invention, is to provide a cutter blade assembly which may be readily converted for use in soil preparation, subsoiling and silage cutting.

From the foregoing objects, it will be readily appreciated that the machine and equipment made in accordance with this invention, would effect a tremendous savings in time, labor, and farm equipment expense. Also, the short interval of time between plowing and planting made possible by use of the machine and equipment in accordance with this invention, is beneficial for crop plant growth while the time saved because of the single operation between plowing and planting, will provide the farmer with more time to cultivate his crops.

In accordance with the foregoing objects, the machine comprises a tractor type vehicle to which a cutter assembly is adjustably connected and extends forwardly from the front end of the vehicle and is operated by the vehicle engine through a forward and reverse drive gear box to rotate the cutter blades in one direction for plowing in preparation of a seed bed or for subsoiling and rotatable in the other direction at a faster speed for silage cutting purposes. The cutter assembly is accordingly raised or lowered into ground engagement for silage cutting and plowing purposes respectively. When used for plowing through planting purposes, the vehicle also pivotally mounts intermediate its ends and beneath its frame a soil packer while a seed planter is attached to the rear portion of the vehicle and extends rearwardly therefrom for planting seeds in the soil prepared by the soil plowing cutter assembly and soil packer. When so used, the cutter blades are mounted in a non-radial fashion and are rotated in a direction to move the cutting edges of the blades downwardly and rearwardly into the soil. In order to convert the machine and equipment into a forage harvester, the rotary cutter assembly is adjustably raised out of contact with the ground and the forward and reverse gear box actuated to rotate the blade in the opposite direction. A hood construction is then placed over the rotary cutter assembly which includes a shear bar therein cooperating with the cutter blades to make silage while blower fan blades are attached to the cutter assembly for blowing the silage up into a blower pipe connected to the top of the hood and extending upwardly and over the vehicle for depositing the silage in a silage wagon now attached to the rearward portion of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view with parts shown in section, of the machine and equipment in accordance with this invention arranged to perform the plowing through planting functions thereof.

FIGURE 2 is a top view of the rotary cutter assembly as viewed through a plane indicated by section line 2—2 in FIGURE 1.

FIGURE 5 is a side elevational view with parts shown in section of the machine and equipment in accordance with this invention, arranged as a forage harvester.

FIGURE 6 is a side view of a single rotary blade mounting assembly of the FIGURE 5 arrangement.

FIGURE 7 is a perspective view of a single soil preparing blade.

FIGURE 8 is a perspective view of a blade that may be used for silage cutting.

FIGURE 9 is a perspective view of a fan blade attachment shown assembled in FIGURE 6.

Figure 3:
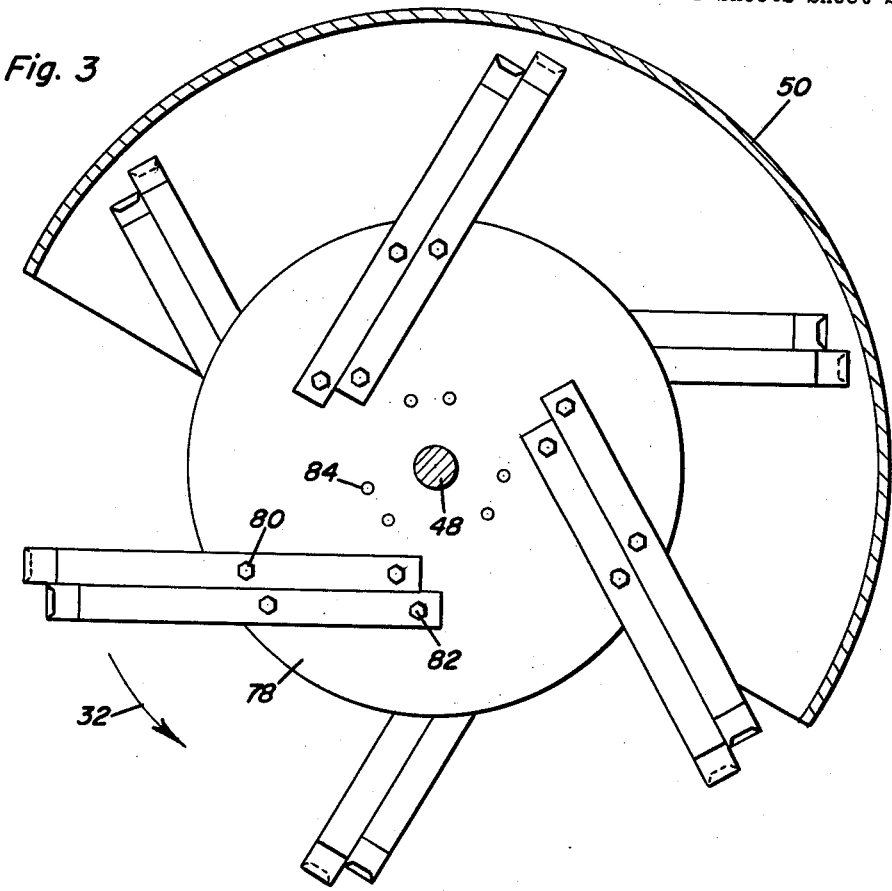
FIGURE 3 is a sectional view of the rotary cutter taken through a plane indicated by section line 3—3 of FIGURE 2.

Referring to the drawing in detail, FIGURES 1 and 5 show a vehicle generally indicated by reference numeral 10 which includes an engine 12 which is drivingly connected by transmission means to front wheels 18 for propelling the vehicle while rear wheels 14 are steerable. Mounted forwardly of the vehicle 10 is a driver's seat 16 and front wheels 18. Pivotally connected to the forward portion of the vehicle 10 and adjustable relative thereto is a cutter supporting assembly 20 on which a rotary cutter assembly generally indicated by reference numeral 22, is rotatably mounted at a forward end thereof. The supporting assembly 20 is adjustably positioned by means of a screw shaft member 24 rotatably mounted at one end adjacent to the driver's seat and having a crank portion 26 for operation by the vehicle driver, the screw shaft member 24 being thereby rotatable within a nut member 28 pivotally supported by a bracket 30 attached to the supporting assembly 20 to thereby pivotally adjust the position of the supporting assembly 20 relative to the vehicle frame.

Referring now to FIGURE 1, the machine and equipment is arranged to perform several farming operations between plowing and planting. As shown by arrow 32 the rotary cutter assembly 22 is rotated in a counterclockwise direction at a slow speed by means of a sprocket 34 connected to one end thereof and having a sprocket chain 36 trained thereover and extending within the supporting assembly 20 into the vehicle for engagement with a driving sprocket 38 shown dotted in FIGURE 1. The driving sprocket 38 is driven by a forward and reverse drive 39 connected to gear box 44 which also is drivingly connected by means of sprocket 42 and a sprocket chain or belt to front wheel drive sprocket 40. The gear box 44 and drive 39 may be selectively controlled by the vehicle driver to controllably propel the vehicle and rotate the rotary cutter assembly 22 in either direction. A power take-off belt 46 is provided for drivingly connecting the engine 12 to the gear box 44. The sprocket wheel 34 is connected to the cutter assembly 22 by means of a drive shaft 48 which is connected to the cutter assembly 22 for rotation thereof as indicated. Also, a dirt shield 50 is provided for enclosing the rearward portion of the cutter assembly 22.

Pivotally supported beneath the vehicle is a soil packer 52 operative in a manner well-known in the art to pack the soil of a seed bed prepared by the rotary cutter assembly 22. Also pivotally attached to the vehicle and extending rearwardly therefrom is a seed planter mechanism generally indicated by reference numeral 54 which is per se of a type well-known in the art. The planter mechanism includes a supporting member 56 pivotally attached to the rear axle tubes of the vehicle and has rotatably mounted at its outer end a press wheel 58. The supporting member 56 carries thereon a seed box 60 containing the seed and a dispensing mechanism therein which is driven by a flexible belt 62 drivingly connected to the rear wheels 14 of the vehicle. A flexible tube 64 deposits the seeds accordingly dispensed from the seed box 60 into a shallow furrow made by a furrowing tool 66 with the seeds being subsequently pressed into the soil by means of the press wheel 58.

From the foregoing description, operation of the machine and equipment arranged as illustrated in FIGURE 1, will be apparent. It will therefore be appreciated, that with the illustrated arrangement soil preparation by the rotary cutter assembly 22 is sequentially followed by further preparation of the soil by the soil packer 52 and finally the planting of seeds within the prepared soil by means of the planter mechanism 54. It will also be appreciated, that the disposal of the soil plowing cutter assembly 22 forwardly of the vehicle is of advantageous import in that the vehicle driver may properly and accurately direct the operation along a desired course and may accordingly control and regulate the depth of soil preparation as required. Also, it will be noted that the machine is properly balanced with the weight of the vehicle itself being disposed centrally between forwardly extending and rearwardly extending attachments.

Referring now to FIGURE 5, it will be noted that the vehicle and equipment have been converted into a forage harvester. In this arrangement, the rotary cutter assembly 22 is rotated in a clockwise direction as seen in FIGURE 5 and indicated by arrow 68. A hood construction 70 is now disposed over the cutter assembly 22 and includes a shear bar 72 for cooperation with the cutter blades of the rotary cutter assembly 22 for making silage, the silage being conducted through blower pipe 74 upwardly and rearwardly over the vehicle 10 from which it is deposited into a silage wagon 76 now being towed rearwardly from the vehicle 10. In the FIGURE 5 arrangement, blower fan blades are attached to the cutter blades for the purpose of blowing the silage through the blower pipe 74, said blower fan blade being mounted in a manner as will be hereafter described in detail. It will therefore be apparent, that the machine is readily converted to a forage harvester by changing the rotary blade mounting and raising the supporting assembly 20 while the soil packer and seed planter attachments are removed and replaced by the silage wagon 76. Also, a different hood construction is utilized for the cutter assembly which includes the shear bar 72 and the blower pipe attached thereto.

Figure 4:
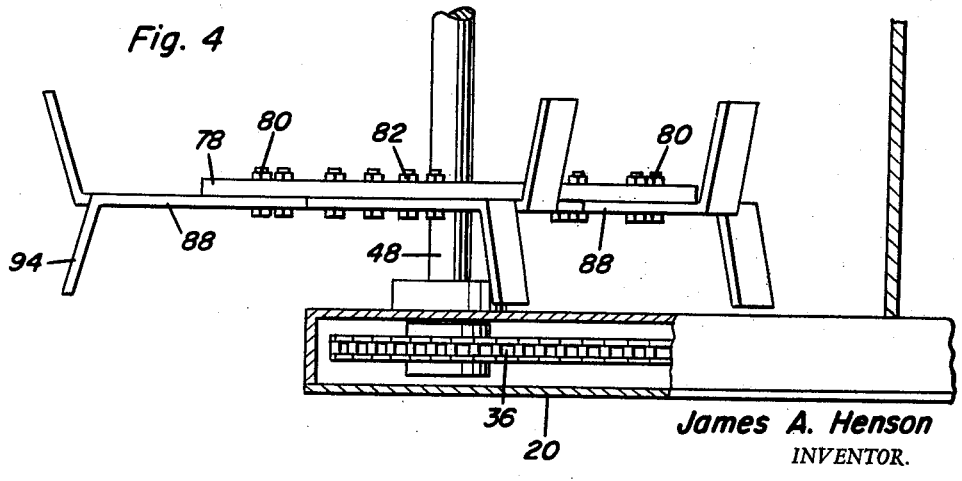
FIGURE 4 is a partial sectional view showing a single rotary blade mounting assembly.

Referring now to FIGURES 3 and 4, a rotary blade mounting assembly is shown arranged for soil plowing and seed bed preparation purposes. Accordingly, the cutter assembly 22 includes a plurality of blade mounting disks 78, twelve of which are shown illustrated in FIGURE 2. Each mounting disk 78 includes a radially outer set of circumferentially spaced apertures through which a pair of cutter blades are attached to the mounting disk 78 by means of bolts 80. A second set of circumferentially spaced apertures are provided in the mounting disk 78 by which the cutter blades are also attached by means of bolts 82 to dispose the cutter blades in non-radial arrangement as seen in FIGURE 3 for seed bed preparation purposes. Also, a set of radially inner circumferentially spaced apertures 84 are provided for alternatively attaching the blades to the mounting disk 78 in a radially disposed fashion as illustrated in FIGURE 6.

In FIGURE 3 the blades attached to the mounting disk 78 are of the form illustrated in FIGURE 7 and are generally indicated by reference numeral 86. Each blade 86 includes a mounting portion 88 having apertures 90 and 92 disposed therein for attachment to the mounting disk 78 by means of bolts 82 and 80 respectively. The blade 86 includes a cutting portion 94 having cutting edges on either side thereof, said portion 94 extending axially with respect to the mounting disk 78 and being flared outwardly as more clearly seen in FIGURE 4. The blades are mounted in pairs with the portions 94 being arranged to extend in opposite axial directions. It will therefore be apparent, that the non-radial alignment of the cutter blades and the counterclockwise direction of rotation endows the cutter assembly with a greater tendency to dig into the soil while the outward tilt of the cutting portion 94 permits the dirt and trash to shed off the blade. Accordingly, by regulating the depth of engagement by adjustment of the control shaft 24, the rotary cutter assembly will form a plurality of shallow trenches in the soil of a desirable moisture holding nature for the growing of crops.

For the purposes of subsoiling, the blades arranged as shown in FIGURE 3 may be made to engage deeper into the soil with the blades from alternate blade mounting assemblies removed so as to space the trenches a greater distance apart and reduce the load on the rotary cutter assembly. Accordingly, the cutter assembly may be used for reaching deeper into the ground, uprooting and stirring the subsoil. It will also be noted, that the cutter blades 86 have two cutting edges and are therefore reversible. Also, the mounting of the blades in pair increases their rigidity and enables them to better resist shock load applied to the blades which first enter the ground.

Referring now to FIGURES 6, 8 and 9, the blade mounting assembly for the blade assembly 22 is altered for the purposes of silage cutting and blowing silage into the blower pipe 74. In this latter arrangement, the blades are mounted in radially aligned position as shown in FIGURE 6 and rotate in a clockwise direction for silage cutting purposes. The form of blade used in this latter arrangement is illustrated in FIGURE 8 wherein the blade generally indicated by reference numeral 96 includes a mounting portion 98 having apertures 100 and 102 for attaching the blade to the mounting disk 78 wherein the aperture 100 of the blade 96 is in alignment with the set of apertures 84 on the mounting disk as previously noted with respect to FIGURE 3. The blades 96 include a cutting portion 104 having one cutting edge 106, said cutting portion 104 being arranged perpendicular to the mounting portion 98. The pairs of cutting blades 96 are mounted on the mounting disk 78 in a similar fashion as illustrated in FIGURES 3 and 4 except for their radial disposition. Also, the blades 96 after cutting the crop will cause the plant stalks to be sheared by the shear bar 72 within the hood 70 as illustrated in FIGURE 5 to thereby make silage.

Referring now to FIGURES 6 and 9, a fan blade generally indicated by reference numeral 108 is shown attached to one of the blades 96 mounted on the mounting disk 78. The fan blade 108 includes an attachment portion 110 by which the fan blade 108 is attached to the mounting disk 78 by means of the bolts extending through the apertures on the blade 96 and the apertures in the mounting disk 78, said bolts extending through apertures 112 and 114 on the attachment portion 110 of the fan blade 108. An impeller portion 116 is provided on the fan blade 108 which is disposed perpendicular to the portion 110 and perpendicular to the mounting disk 78 when mounted thereon. Accordingly, the fan blades 103 will push air into the hood 70 and blower pipe 74 as will be apparent from FIGURE 5.

The various operation and functions of the machine and equipment made in accordance with this invention, will be apparent from the foregoing description. It is particularly important that the novel blade mounting construction enables the conversion of the rotary cutter assembly between various different uses to thereby make possible the simple conversion of the machine and equipment as a whole from one use to another.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An agricultural machine comprising, vehicle means adapted to be propelled in a forward direction, supporting means adjustably mounted on said vehicle means and extending forwardly therefrom, rotary means rotatably mounted at the forward end of the supporting means in downwardly exposed relation for all positions of the supporting means, blade means adjustably mounted on the rotary means for downward exposure to matter engaged thereby when the supporting means is either in a lowered position or in an elevated position, forward and reverse drive means drivingly connected to said rotary means for movement of the exposed blade means in a direction opposite to said forward direction when the supporting means is in said lowered position and in the forward direction when the supporting means is in said elevated position, attachment means operatively connected to the vehicle means and extending rearwardly therefrom for contact with said matter engaged by the blade means in response to forward movement of the vehicle means, and driver operated means mounted on said vehicle means and operatively connected to said supporting means for selectively lowering said blade means into ground engagement for plowing and soil matter preparation and raising said blade means above ground surface for silage matter cutting, said forward and reverse drive means being operative to rotate said rotary means in one direction at a slow speed for plowing and soil matter preparation and in the other direction at a fast speed for silage matter cutting, said rotary means including a plurality of cutter mounting disks rotatably mounted by said supporting means, said mounting disks having cutter blade attaching means thereon operative to mount said blade means both radially with respect to the disks for silage matter cutting and non-radially for plowing and soil matter preparation.

2. The machine as defined in claim 1, wherein said blade attaching means include a first radially outer set of apertures, a second radially inner set of apertures in radial alignment with the first set and a third radially inner set of apertures in non-radial alignment with said first set, and fastening means extending through said first set of apertures and one of said radially inner sets of apertures to fasten the blade means to the rotary means.

3. The combination of claim 2 wherein said blade means includes, circumferentially spaced pairs of separate abutting cutter blades fastened to opposite sides of said mounting disk through said sets of apertures.

4. The assembly as defined in claim 3, wherein each pair of cutter blades have radially outer cutting edges extending in opposite axial directions relative to the mounting disk.

5. The combination of claim 1 wherein said blade means comprises, at least one pair of separate radially elongated blade members, cutter edge portions extending from said blade members in opposite axial directions with respect to the respective mounting disks, and blade attaching means mounted on said mounting disks for securing said blade members to the mounting disks parallel to each other alternatively in radial and non-radial relation to said axis to either radially align or space the edge portions for silage cutting and earth cultivation purposes respectively.

References Cited in the file of this patent

UNITED STATES PATENTS

| | | |
|---|---|---|
| 913,953 | Granger | Mar. 2, 1909 |
| 1,282,124 | Phillips | Oct. 22, 1918 |
| 1,419,477 | Summerlin | June 13, 1922 |
| 1,463,492 | Varland | July 31, 1932 |
| 2,394,017 | Seaman | Feb. 5, 1946 |
| 2,556,072 | Dewey | June 5, 1951 |
| 2,720,070 | Arrington | Oct. 11, 1955 |
| 2,752,837 | Parker | July 3, 1956 |
| 2,864,223 | Lundell | Dec. 16, 1958 |
| 2,903,077 | Kamlukin | Sept. 8, 1959 |

FOREIGN PATENTS

| | | |
|---|---|---|
| 276,828 | Germany | July 21, 1914 |